(12) United States Patent
Karch et al.

(10) Patent No.: US 7,444,219 B2
(45) Date of Patent: Oct. 28, 2008

(54) DEVICE FOR EVALUATING VEHICLE, DRIVING AND OPERATING PARAMETERS

(75) Inventors: Gerald Karch, Friedrichshafen (DE); Matthias Winkel, Weingarten (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 727 days.

(21) Appl. No.: 10/519,829

(22) PCT Filed: Jul. 3, 2003

(86) PCT No.: PCT/EP03/07090

§ 371 (c)(1),
(2), (4) Date: Dec. 29, 2004

(87) PCT Pub. No.: WO2004/005768

PCT Pub. Date: Jan. 15, 2004

(65) Prior Publication Data
US 2006/0009898 A1   Jan. 12, 2006

(30) Foreign Application Priority Data
Jul. 9, 2002    (DE) ................. 102 30 765

(51) Int. Cl.
*F16H 16/02* (2006.01)
*G01M 13/02* (2006.01)
*G06F 19/00* (2006.01)

(52) U.S. Cl. ........................................ 701/51

(58) Field of Classification Search .......... 701/67, 701/29, 35, 51, 63; 702/182; 73/162, 118.2; 74/335; 340/438, 453
See application file for complete search history.

(56) References Cited

U.S. PATENT DOCUMENTS

| | | | |
|---|---|---|---|
| 4,897,790 A | | 1/1990 | Bieber |
| 5,593,364 A | | 1/1997 | Ishii et al. |
| 5,954,776 A | | 9/1999 | Saito et al. |
| 6,040,768 A | * | 3/2000 | Drexl .................... 340/453 |
| 6,225,892 B1 | * | 5/2001 | Chene .................... 340/438 |
| 6,246,942 B1 | | 6/2001 | Dobler et al. |
| 6,278,925 B1 | * | 8/2001 | Wozniak .................... 701/54 |
| 6,526,816 B2 | * | 3/2003 | Genise et al. .............. 73/118.1 |
| 6,819,987 B2 | * | 11/2004 | Depping et al. ............... 701/29 |

FOREIGN PATENT DOCUMENTS

| | | |
|---|---|---|
| DE | 44 38 914 A1 | 5/1996 |
| DE | 197 41 182 A1 | 4/1998 |
| DE | 197 03 561 A1 | 8/1998 |
| DE | 197 57 317 A1 | 7/1999 |
| EP | 0 255 519 B1 | 3/1989 |
| EP | 0 310 275 A2 | 4/1989 |
| EP | 1 120 588 A2 | 8/2001 |
| GB | 2 332 251 A | 6/1999 |

* cited by examiner

*Primary Examiner*—Tan Q Nguyen
(74) *Attorney, Agent, or Firm*—Davis Bujold & Daniels, P.L.L.C.

(57) ABSTRACT

A device for evaluating vehicle, driving and operating parameters of a vehicle, in order to adjust the gear ratio of a transmission according to predetermined algorithms, parameters, or characteristic diagrams, selects anew the gear to be adjusted and adjusts the same by way of an evaluation in dependence upon criteria that are specific to the transmission.

6 Claims, 1 Drawing Sheet

DEVICE FOR EVALUATING VEHICLE, DRIVING AND OPERATING PARAMETERS

This application is a national stage completion of PCT/EP2003/0070907 filed Jul. 3, 2003 which claims priority from German Application Serial No. 102 30 765.2 filed Jul. 9, 2002.

FIELD OF THE INVENTION

The invention concerns a device for evaluating vehicle, driving and operating parameters.

BACKGROUND OF THE INVENTION

The desire for a greater economy with a very good drivability requires a better adaptation of the vehicle operating conditions in motor vehicles to the most advantageous operating ranges of a driving engine. This is achieved by means of multi-speed or continuously variable transmissions having a great transmission range. In order to exploit the advantages, the speeds of the transmission should be optimally changed or shifted, which places high demands on the driver. If the continuously variable transmission is treated as a transmission with infinite speeds, the considerations that are valid for continuously variable transmissions can be transferred similarly, as a rule, also to multi-speed transmissions. For purposes of simplicity, reference will be made in the following embodiments especially to a multi-speed transmission and the terminology compatible therewith.

In order to relieve the driver and increase riding comfort, more and more vehicles are being offered with a fully automated transmission consisting of an engine, a starter element, for example a clutch and/or a converter, a transmission with different gear ratios and a drive axle with wheels. Part of the automation consists in selecting an advantageous gear ratio for the respective operating condition of the vehicle and determining the correct shifting point. Economy and riding comfort should be taken into consideration at the same time.

Known automatically shifting step-by-step variable gears for motor vehicles are shifted automatically within the range of available speeds primarily depending upon speeds that are proportional to the driving speed and upon load conditions, for example, the position of an accelerator pedal or throttle pedal during idle, partial load, full load or kickdown. In order to reduce the number of shifting operations, the driver can exclude speeds in the upper or lower range from the shifting sequence via a selector switch, for example, while ascending a mountain or during winter operation.

Also known are systems in which the microprocessor electronics determine the speed to be shifted in accordance with a predetermined computer program. If a high shifting characteristic or kickdown is reached in the shifting characteristic field, the electronics trigger a corresponding shifting operation. The torque of the engine is reduced during the shifting operation in order to burden the friction elements less and improve shifting comfort. Several programs having different shifting diagrams are provided for different driving situations. The shifting can occur automatically between the individual shifting diagrams. It is also possible to adapt the shifting characteristics in dependence upon operating parameters.

Multi-speed transmissions, which are shifted with an interruption of the tractive force, are frequently used for utility vehicles. A control device for automatically shifting multi-speed, step-by-step variable gears is known, for example, from EP 0 255 519 B1, in which the shifting points are fixed in dependence upon the vehicle speed, the torque requirement (throttle lever position) and the acceleration determined from the speeds of the gearbox output shaft.

The throttle pedal position is further divided into three regions, namely, into an idle region, a central region and a full load region. To each region of the throttle pedal position is allocated an acceleration region so that under these prerequisites eighteen shifting points result. The shifting conditions for the shifting points are retained in tables wherein the values are determined empirically or by calculation. Several tables may be needed, depending on the number of running programs that are utilized.

From DE 197 03 561 A1, a device for evaluating vehicle, driving and operating parameters is known, which makes a selection of gear ratios available and can be utilized as a standard for different automatically shifting transmissions and requires a low synchronization effort. This device serves for evaluating the vehicle, driving and operating parameters of a vehicle, in order to select and adjust a gear ratio of a transmission by means of a microprocessor in accordance with specific algorithms, parameters or characteristic diagrams, wherein an acceleration of the vehicle is determined by calculation from the change of the driving speed corresponding to the speed of a power train with an engine and a transmission.

The devices for evaluating vehicle, driving and operating parameters of a vehicle that are known from the state of the art, which select and adjust a gear ratio of a transmission by means of a microprocessor in accordance with predetermined algorithms, parameters, or characteristic diagrams, have a disadvantage that they do not take into consideration among the influence parameters any of the changes subjected to durability or service life. Gear selection thus occurs based on evaluation criteria that refer to the new condition, and not the changes in the transmission and on the vehicle caused by the operation.

It is the object of the present invention to outline a device for evaluating vehicle, driving and operating parameters of a vehicle, which evaluates a gear ratio of a transmission according to predetermined algorithms, parameters, or characteristic diagrams, while taking into consideration specific transmission criteria and parameters; selects and adjusts the same by means of a microprocessor. The gear selection occurs, in particular, based on the evaluation criteria, which take into consideration the changes in the transmission and on the vehicle caused by the operation.

SUMMARY OF THE INVENTION

The gear selected and adjusted by the microprocessor based on the vehicle, driving and operating parameters is evaluated, selected and adjusted in dependence upon specific operating criteria. The evaluation criteria are adapted especially to the properties of the transmission. The evaluation criteria can be, among other things, the service life or the durability based on the different loads of different transmission components. Consequently, the actuation frequency of an actuator or a synchronization or also the service life design of a gear can be, for example, a criterion for the selection of the next gear to be engaged in view of a load collective. Further criteria can be, among other things: noises, shifting times, the driving portions within the different gear ratios, i.e., the length of time during which a specific drive position is engaged; also the relationship to the lengths of time during which other drive positions are engaged, the distribution of the temperatures existing in the transmission and the aging of the transmission oil, wherein the oil temperature, the drive-through capacity of the transmission, the drive power that has passed through the transmission and the driving portions within the different gear ratios are taken into consideration.

The invention is suitable for all vehicles having a fully automatic or partially automatic drive train consisting of an engine with or without starter element, e.g., a clutch and/or a converter, a transmission with different gear ratios and a drive axle with wheels. The transmission can be a continuously variable transmission, as well as a multi-speed transmission, which is shifted with an interruption of the tractive force or under load.

BRIEF DESCRIPTION OF THE DRAWINGS

The invention will now be described, by way of example, with reference to the accompanying drawings in which.

DETAILED DESCRIPTION OF THE INVENTION

Figure 1:
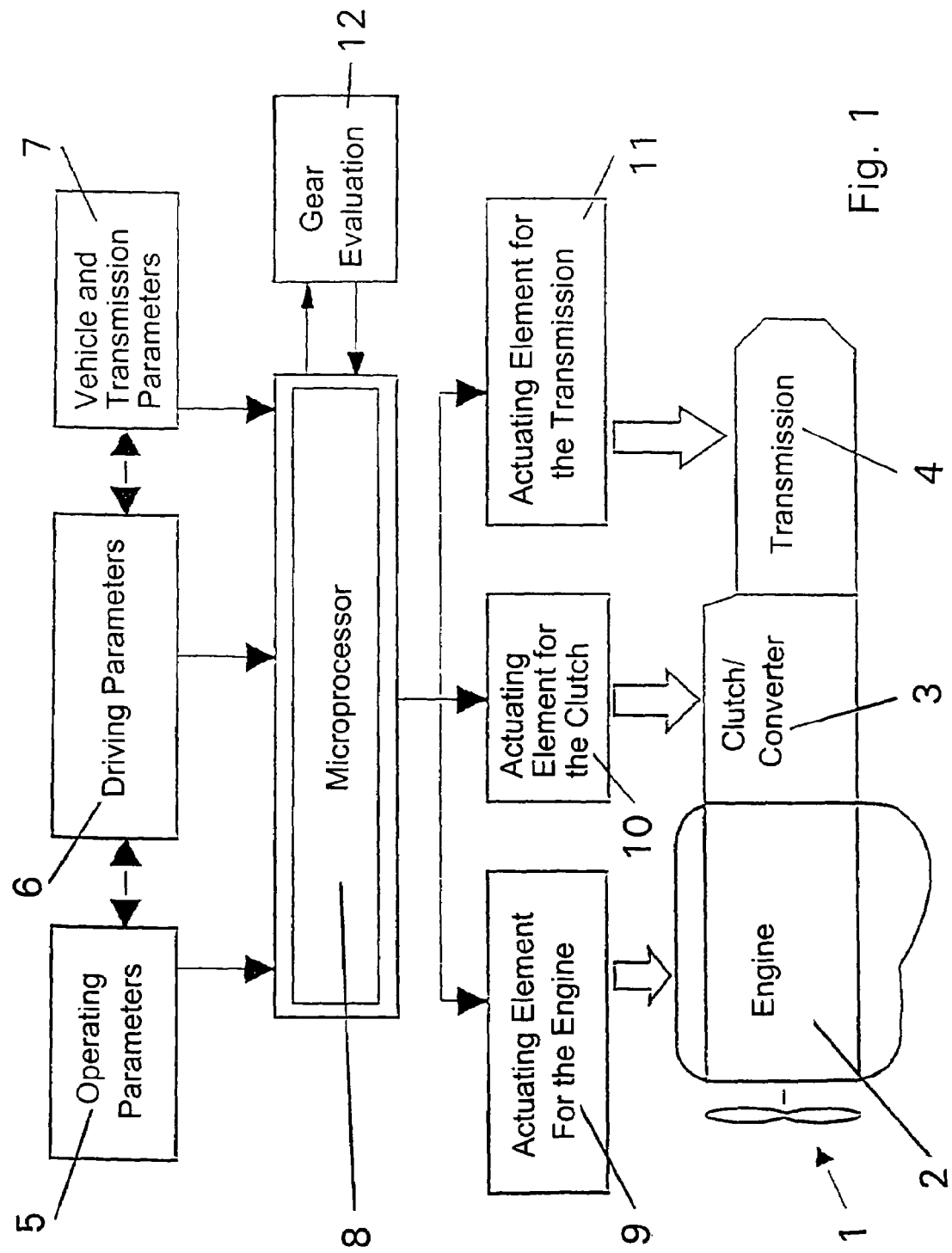
FIG. 1 is a schematic representation of the sequence of a drive train control according to the invention.

The single FIGURE shows a drive train 1 and an engine 2, a starter element, for example, a clutch or a converter 3, and a transmission 4. The transmission 4 can be a multi-speed or a continuously variable transmission, which is shifted with an interruption of the tractive force and/or under load. A microprocessor 8 controls the drive units 2, 3, and 4 of the drive train 1 in dependence upon operating parameters 5, drive parameters 6 and vehicle and transmission parameters 7, and generates output signals for an actuating element 9 of the engine 2, an actuating element 10 of the clutch 3, and an actuating element 11 of the transmission 4 according to predetermined algorithms, parameters, or characteristic diagrams. To the operating parameters 5 belong, for example, the position of an accelerator pedal, as a rule a throttle, their change over a period of time, as well as the acceleration of the accelerator actuation, and braking and steering signals. To the driving parameters 6 belong, for example, the flow rate of a fuel measuring unit or a load signal, an engine speed, an ignition angle adjustment, a temperature, for example, the coolant temperature, an aggregate temperature, etc. To the vehicle and transmission parameters 7 belong a position of the gear selector lever or a gear shifting or changing device of the transmission 4, a driving speed or a speed in the drive train associated therewith, longitudinal acceleration and transverse acceleration, load conditions, tractive resistances, and temperatures. Because of the vehicle and transmission parameters 7, a gear evaluation 12 takes place, which selects the gear to be newly adjusted and adjusts the same with the aid of the actuating element 11 of the transmission 4.

REFERENCE NUMERALS 1 drive train
2 engine
3 clutch/converter
4 transmission
5 operating parameters
6 driving parameters
7 vehicle and transmission parameters
8 microprocessor
9 actuating element for the engine
10 actuating element for the clutch
11 actuating element for the transmission
12 gear evaluation

The invention claimed is:

1. A device for evaluating parameters and selecting and implementing adjustment of gear ratios for a vehicle, the device comprising:
   a microprocessor (8) being coupled to a drive train (1) of a vehicle via an engine actuating element (9), a clutch actuating element (10) and a transmission actuating element (11), the microprocessor (8) receiving at least one of operating parameters (5), driving parameters (6) and vehicle and transmission parameters (7) and generates output signals from the at least one of the operating parameters (5), the driving parameters (6) and the vehicle and transmission parameters (7) based on at least one of predetermined algorithms, parameters and diagrams;
      the output signals being sent to at least one of the engine actuating element (9), the clutch actuating element (10) and the transmission actuating element (11) for controlling operation of the drive train (1); and
      the operating parameters (5), the driving parameters (6) and the vehicle and transmission parameters (7) including at least one of an actuation frequency of an actuator and a service life of a gear to be engaged.

2. The device according to claim 1, wherein the operating parameters (5) comprise at least one of:
   an accelerator position,
   a throttle position,
   a change in the accelerator position over time,
   a change in the throttle position over time,
   an acceleration of accelerator actuation,
   a braking signal, and
   a steering signal.

3. The device according to claim 1, wherein the driving parameters (6) comprise at least one of:
   a flow rate of a fuel measuring unit,
   a load signal,
   an engine speed,
   an ignition angle adjustment,
   a coolant temperature, and
   an aggregate temperature.

4. The device according to claim 1, wherein the vehicle and transmission parameters (7) include at least one of:
   a transmission gear selector lever position,
   a transmission gear shifting device position,
   a transmission gear changing device position,
   a drive speed,
   a rotational speed of the drive train,
   a longitudinal acceleration of the vehicle,
   a transverse acceleration of the vehicle,
   a load condition of the vehicle,
   a tractive resistance of the vehicle,
   driving portions within different gear ratios,
   a length of time of engagement of a specific gear,
   a relationship between the length of time of engagement of the specific gears relative to other gears of the transmission,
   a distribution of temperatures within the transmission,
   an age of transmission oil,
   a transmission oil temperature,
   a transmission drive-through capacity,
   an amount of drive power passed through the transmission, and
   a portion of the amount of drive power passed through the transmission of the different gear ratios.

5. A device for evaluating parameters and selecting and implementing adjustment of gear ratios for a vehicle, the device comprising:

a microprocessor (8) being respectively coupled to an engine, a starting element and a transmission of the vehicle via an engine actuating element (9), a starter actuating element (10) and a transmission actuating element (11), the microprocessor (8) receiving at least one of operating parameters (5), driving parameters (6) and vehicle and transmission parameters (7) and generating, from the at least one of the operating parameters (5), the driving parameters (6) and the vehicle and transmission parameters (7), output signals based on at least one of predetermined algorithms, parameters and diagrams;

the output signals being sent bat least one of the engine actuating element (9) for controlling operation of the engine, the starter actuating element (10) for controlling operation of the starting element and the transmission actuating element (11) for controlling operation of the transmission;

the operating parameters (5), the driving parameters (6) and the vehicle and transmission parameters (7) comprising at least one of an actuation frequency of an actuator and a service life of a gear to be engaged.

6. A device for evaluating parameters and selecting and implementing adjustment of gear ratios for a vehicle, the device comprising:

a microprocessor (8) being respectively coupled to an engine, a starting element and a transmission of the vehicle via an engine actuating element (9), a starter actuating element (10) and a transmission actuating element (11), the microprocessor (8) receiving at least one of operating parameters (5), driving parameters (6) and vehicle and transmission parameters (7) and generating, from the at least one of the operating parameters (5), the driving parameters (6) and the vehicle and transmission parameters (7), output signals based on at least one of predetermined algorithms, parameters and diagrams;

the output signals being sent to at least one of the engine actuating element (9) for controlling operation of the engine, the starter actuating element (10) for controlling operation of the starting element and the transmission actuating element (11) for controlling operation of the transmission;

the operating parameters (5), the driving parameters (6) and the vehicle and transmission parameters (7) comprising at least one of an actuation frequency of an actuator and a service life of a gear to be engaged;

the operating parameters (5) further comprising at least one of an accelerator position, a throttle position, a change In the accelerator position over time, a change in the throttle position over time, an acceleration of accelerator actuation, a braking signal and a steering signal;

the driving parameters (6) further comprising at least one of a flow rate of a fuel measuring unit, a load signal, an engine speed, an ignition angle adjustment, a coolant temperature and an aggregate temperature; and the vehicle and transmission parameters (7) further comprising at least one of a transmission gear selector lever position, a transmission gear shifting device position, a transmission gear changing device position, a drive speed, a rotational speed of the drive train, a longitudinal acceleration of the vehicle, a transverse acceleration of the vehicle, a load condition of the vehicle, a tractive resistance of the vehicle, driving portions within different gear ratios, a length of time of engagement of a specific gear, a relationship between a length of time of engagement of the specific gear relative to other gears of the transmission, a distribution of temperatures within the transmission, an age of transmission oil, a transmission oil temperature, a transmission drive-through capacity, an amount of drive power passed through the transmission, a portion of the amount of drive power passed through the transmission of the different gear ratios.

\* \* \* \* \*